United States Patent [19]

Sakuno et al.

[11] Patent Number: 4,981,026
[45] Date of Patent: Jan. 1, 1991

[54] STEERING COLUMN SHAFT LOCKING DEVICE FOR AN AUTOMOTIVE VEHICLE

[75] Inventors: Hideaki Sakuno; Mikio Masaki; Toshikazu Kobayashi; Hidekazu Sato, all of Tokyo, Japan

[73] Assignee: Kokusan Kinzoku Kogyo Kabushiki Kaisha, Tokyo, Japan

[21] Appl. No.: 331,620

[22] Filed: Mar. 30, 1989

[30] Foreign Application Priority Data

Mar. 31, 1988 [JP] Japan ................................. 63-76431
Jun. 30, 1988 [JP] Japan ............................... 63-160907

[51] Int. Cl.⁵ ............................................ B60R 25/02
[52] U.S. Cl. ....................................... 70/186; 70/252; 70/360
[58] Field of Search ......................... 70/252, 183–186, 70/360, 361

[56] References Cited

U.S. PATENT DOCUMENTS

| 2,023,208 | 12/1935 | Olson | 70/360 |
| 4,495,786 | 1/1985 | Masaki et al. | 70/252 X |
| 4,516,415 | 5/1985 | Kobayashi et al. | 70/252 |
| 4,580,822 | 4/1986 | Fukumoto | 292/DIG. 53 X |
| 4,685,313 | 8/1987 | Neyret | 70/252 X |

FOREIGN PATENT DOCUMENTS

| 1962783 | 6/1971 | Fed. Rep. of Germany | 70/252 |
| 2133734 | 1/1973 | Fed. Rep. of Germany | 70/252 |
| 3031930 | 4/1982 | Fed. Rep. of Germany | 70/252 |
| 3506965 | 9/1986 | Fed. Rep. of Germany | 70/252 |
| 58-112849 | 7/1983 | Japan . | |
| 61-295154 | 12/1986 | Japan . | |
| 2018882 | 10/1979 | United Kingdom | 70/252 |
| 2071197 | 9/1981 | United Kingdom | 70/333 R |

Primary Examiner—Lloyd A. Gall
Attorney, Agent, or Firm—Bachman & LaPointe

[57] ABSTRACT

A steering column shaft locking device is disclosed in which a lever is rotatably mounted in a key cylinder when a key is inserted into the key cylinder, producing reaction force on a front wall of a housing, thereby causing the key cylinder to move backward against resilient force of a spring in order to certainly operate a key detecting switch provided in an ignition switch device. A guard plate is provided between the key cylinder and the front end of the housing so as to rotate it together with the key cylinder and guard plate when the key is rotated. Forward movement of the key cylinder is controlled by a retainer placed at the proximity thereof and a detent placed therein. The spring urges the key cylinder and the retainer in the forward direction and the detent radially inwardly. The guard plate serves to prevent abrasion of the lever and unauthorized insertion of tools into the device.

15 Claims, 6 Drawing Sheets

STEERING COLUMN SHAFT LOCKING DEVICE FOR AN AUTOMOTIVE VEHICLE

BACKGROUND OF THE INVENTION (a) Field of the Invention

The present invention relates to a locking device, especially to a steering column shaft locking device for an automotive vehicle.

(b) Description of the Prior Art

Coincidental locks have been equipped in steering columns to prevent theft of automotive vehicles, and as disclosed for example in U.S. Pat. No. 4,487,042, they are coupled with an ignition switch for controlling driving of the vehicle. Usually, a steering column locking device comprises a frame, a key cylinder mounted within the frame for rotation around its longitudinal central axis by a key between "LOCK" and "ON" or "START" positions through "ACC" position, a cam rotatable with the key cylinder, a locking rod in cooperation with the cam and a spring for moving between a locking position in which it is engaged with a steering shaft and an unlocking position in which it is disengaged from the steering shaft, and an ignition switch disposed rearward of the cam in driving relation thereto.

After the key is inserted into the key cylinder, it may be rotated around the longitudinal central axis from "LOCK" position to "OFF", "ACC" "ON" and "START" positions. In "ON" position, the ignition switch supplies electric power to an engine and in "START" position, a starter motor is energized to start the engine. When the key is pulled out of the locking device in "LOCK" position, rotation of the key cylinder to "ON" position is inhibited, and thereby, the steering shaft is prevented from rotation and the ignition switch can not be operated for anti-theft purpose.

Some of prior art steering shaft locking devices include key detecting means for sensing insertion of the key into the key cylinder. Prior art key detecting means comprises a first pin slidably disposed within the key cylinder, a second pin for detecting sliding movement of the first pin and a microswitch attached to an inner or outer surface of the locking device so as to be operated by movement of the second pin. The microswitch is attached to the locking device together with a plurality of additional parts such as fixing members and a harness connected to the switch. This structure obviously results in increased number of parts to be assembled, complicated assembling process and larger size of the locking device. To relieve these problems, a new and practical structure of steering lock devices has been required for many years.

SUMMARY OF THE INVENTION

An object of the present invention is to provide a steering column shaft locking device capable of detecting insertion and pulling out of a key by movement of a key cylinder caused with insertion of the key.

Another object of the invention is to provide a steering column shaft locking device wherein insertion of the key into the device may be detected by an ignition switch device.

A still another object of the invention is to provide a steering column shaft locking device which can strongly resist against unauthorized or unjust destruction or injury thereof.

According to the present invention, a steering column shaft locking device for an automotive vehicle is provided which comprises a housing, a key cylinder positioned within the housing for rotation around its longitudinal central axis and longitudinal movement by a key, a locking rod capable of traveling between a locking position engaged with a steering shaft and an unlocking position disengaged from the steering shaft, a lever mounted within the key cylinder and being rotated around an additional axis for applying reaction force on a front wall of the housing when the key is inserted into the key cylinder, thereby causing the key cylinder to inwardly travel in the housing, and a guard plate disposed adjacent to the lever and between the front wall of the housing and cylinder.

The front wall of the housing is defined by a rim integrally formed with the housing or by a cover secured to the housing. The guard plate is placed for rotation within a circular or annular recess formed between the housing or sleeve contained therein and a cover which is fixed at the front end of the housing. A spring is provided for urging the key cylinder and the lever toward the front wall of the housing or the cover.

The lever includes a lever body and a pair of pins protruded from the lever body, one end of which is in contact with the key inserted so that the lever body may rotate around the pins as an additional axis of the lever. Otherwise, a half cylindrical notch may be formed in the lever to receive a complementary half cylindrical protrusion formed as a rotative axis in the key cylinder.

As a result, the other end of the lever body applies reaction force on the front wall of the housing for longitudinal movement of the key cylinder. When the key cylinder is rotated around its longitudinal central axis from "LOCK" to "ON" position, a retainer is brought into engagement with the locking rod in an unlocking position to the hold the locking rod in the same unlocking position until the key is pulled out. The retainer is urged by the spring in a direction away from the locking rod to simultaneously apply a resilient force on the key cylinder toward a front end of the housing.

A bezel is attached to the front end of the housing and having a recess formed on the inner surface. The key cylinder is provided with a protrusion which extends through an opening formed in the front wall of the housing into the recess of the bezel to prevent rotation of the bezel when the key cylinder is in the locking position.

When the key is inserted into the locking device, it comes into engagement with one end of the lever which is therefore rotated around its pins. The other end of the lever applies a reaction force on the front wall of the housing with or without the guard plate, thereby causing the key cylinder to move inwardly. By movement of the key cylinder, a switch provided in the ignition switch device is operated to detect the insertion of the key. When the key is rotated together with the key cylinder around its longitudinal central axis, the lever and the guard plate are integrally rotated, and the other end of the lever is always kept in contact to the guard plate or front wall of the housing.

The lever may exactly detect the insertion of the key into the key cylinder, and the key cylinder slides enough stroke of travel to surely operate the switch provided in the ignition switch device.

The above-mentioned as well as other objects of the present invention will become apparent during the course of the following detailed description and appended claims.

DETAILED DESCRIPTION OF THE INVENTION

Figure 1:
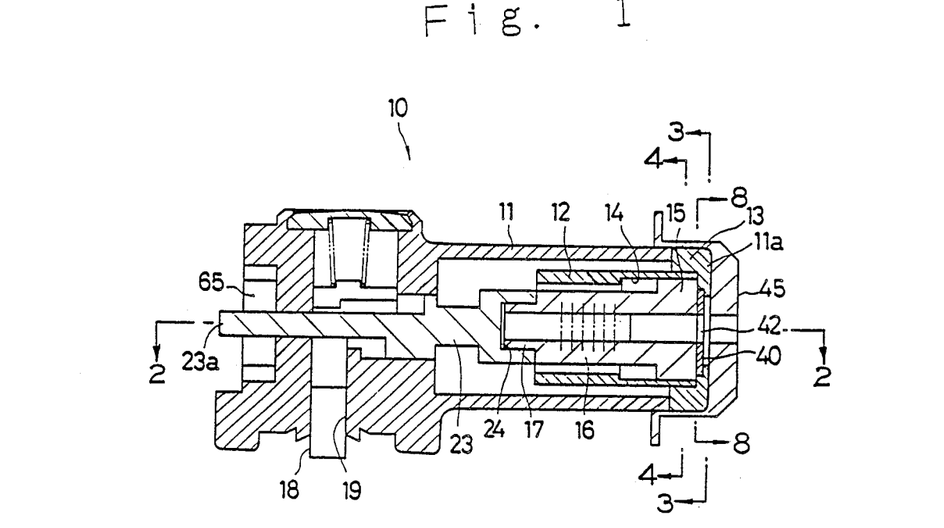
FIG. 1 is a sectional view of the steering column shaft locking device of the present invention, taken along a vertical plane passing through a longitudinal central axis of the device.

As shown in FIG. 1, a steering column shaft locking device 10 according to the present invention comprises a housing 11, a sleeve 12 positioned within the housing 11, and a cover 13 forming a front wall 11a of the housing 11 which is secured at a front end of the sleeve 12. A key cylinder 16 having a flange 15 is diposed within a cavity 14 formed in the sleeve 12 and is rotatable around its longitudinal central axis. Not shown in detail, but the key cylinder 16 is provided with a plurality of radial slots in which tumblers are slidably mounted in a usual manner.

Figure 2:
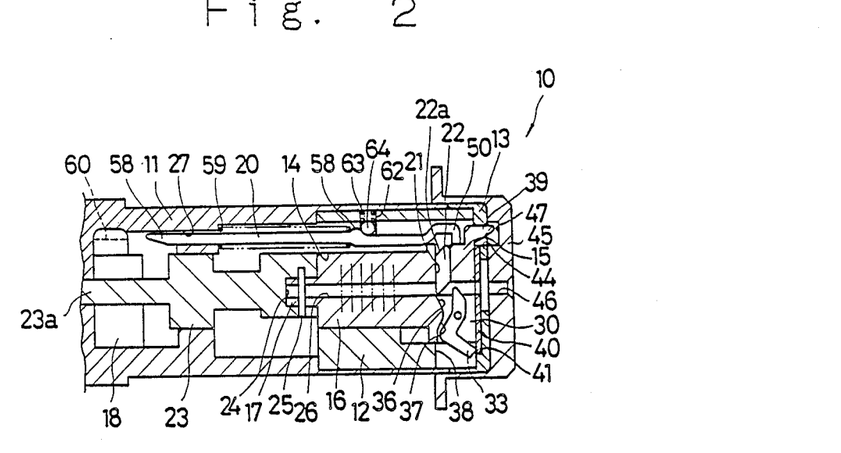
FIG. 2 is a sectional view taken along a horizontal plane passing through a longitudinal central axis of the device.
Figure 3:
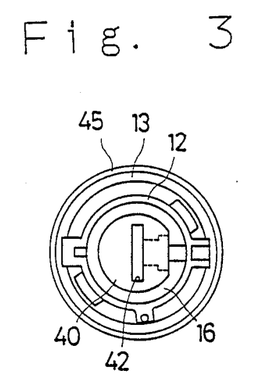
FIG. 3 is a sectional view taken along a line 3—3 in FIG. 1.
Figure 4:
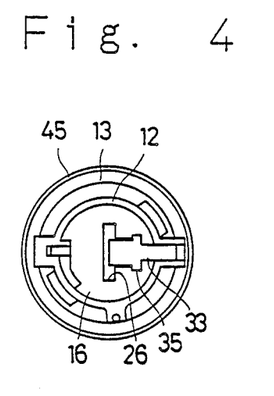
FIG. 4 is a sectional view taken along a line 4—4 in FIG. 1.

As seen from FIG. 2, a retainer 20 is placed in a longitudinal recess formed in the sleeve 12 for sliding movement back and forth along the recess. A detent 22 is slidably located within a hole 21 radially formed at the flange 15 of the key cylinder 16. A locking rod 18 is mounted within a hole 19 of the housing 11 for sliding movement between a locking position in which the locking rod 18 is protruded from the housing 11 and an unlocking position in which it is withdrawn in the housing 11. For the detailed structure and operation of these members including the retainer 20, reference may be made to U.S. Pat. No. 4,495,786 which discloses a control member and a check lever actuated thereby. An inner end 17 of the key cylinder 16 is placed within a hole 24 formed in a rotator 23 which is rotatably mounted within the housing 11 in alignment with the key cylinder 16. A pin 25 rigidly connects the inner end 17 and the rotator 23, the rear end 23a of which extends to an ignition switch device to operate a key detecting switch not shown.

Figure 5:
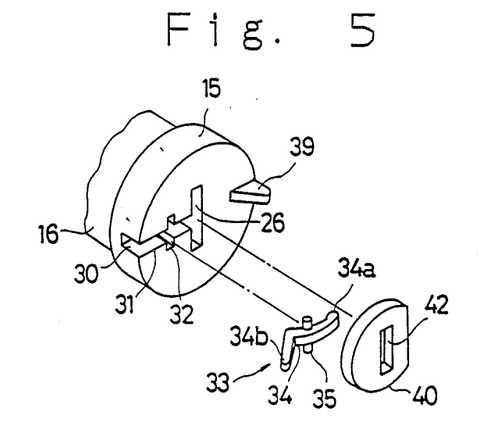
FIG. 5 is an exploded perspective view indicating a lever supported within a key cylinder and a guard plate.
Figure 6:
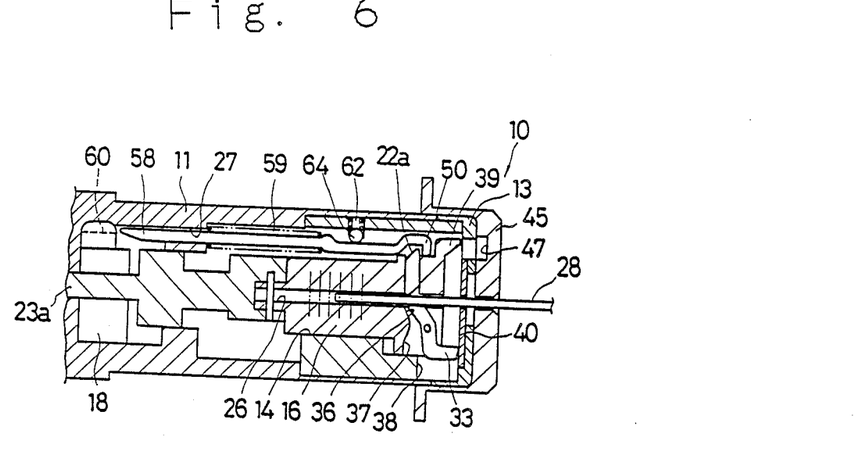
FIG. 6 is a sectional view with a key inserted into the key cylinder of the device shown in FIG. 2.

FIG. 5 illustrates the flange 15 of the key cylinder 16 which is formed with a transverse slot 30 in communication to a key hole 26 into which a key (FIG. 6) is inserted. The transverse slot 30 includes a lateral slot portion 31 radially extending from the key hole 26 and branched slot portions 32 approximately at a right angle to the lateral slot portion 31 and parallel to the key hole 26. As shown in FIG. 2, two radial walls 36 and 37 of the lateral slot portion 31 are provided substantially forming a V-shape section. A notched surface 38 is formed at the front portion of the sleeve 12 in which a portion of the lever 33 is placed. A protrusion 39 extending toward the cover 13 is provided at the flange 15 of the key cylinder 16.

Mounted within the slot 30 is a lever 33 which comprises a lever body 34 of rectangular section and substantially L-shape and a pair of pins 35 which are protruded at a right angle from the lever body 34. These pins 35 are placed approximately parallel to the key hole 26 and normal to the longitudinal central axis of the key cylinder 16 so as to rotate the lever 33 in a plane substantially normal to the key hole 26. The lever body 34 has one end 34a capable of being in contact with the key inserted into key hole 26, and the other end in contact relation to a guard plate 40. The distance between the pin 35 and the other end 34b is larger than that between the pin 35 and one end 34a. Therefore, in the embodiment, when the lever 33 is rotated around the pins 35, the key cylinder 16 moves rearward in a large stroke. In anyway, the distance between the pins 35 and one or the other end 34a, 34b may be determined in view of the design of the locking device. Otherwise, a half cylindrical notch in lieu of the pins 35 may be formed in the lever 33 to receive a complementary half cylindrical protrusion formed in the key cylinder 16.

When the lever 33 is disposed within the slot 30, the lever body 34 and pins 35 are placed respectively within the lateral slot portion 31 and branched slot portions 32. The pins 35 of a circular section are suitably seated within the branched slot portions 32 having the complementary half-cylindrical shape so that the lever body 34 may be swung within the lateral slot portion 31 around the pins 35.

Provided on an inner wall of the cover 13 is a circular recess 41 in which a guard plate 40 is positioned. The guard plate 40 is made of a hard metal such as a sintered alloy into a crescent shape with an opening 42. The guard plate 40 serves to prevent unauthorized insertion of a tool into the key hole 26 of key cylinder 16. In the shown embodiment, the guard plate 40 is attached between the cover 13 and sleeve 12. Since the sleeve 12 is rigidly fixed to the housing 11, the guard plate 40 can rotate, but not axially move. Instead, the guard plate 40 may be placed between the cover 13 and the key cylinder 16 if the guard plate 40 is formed with a small diameter. When the key 28 is inserted into the key hole 26 of the key cylinder 16, the lever 33 is rotated by the key so that the guard plate 40 can not be axially moved although it is free to rotate.

Figures 7, 8:
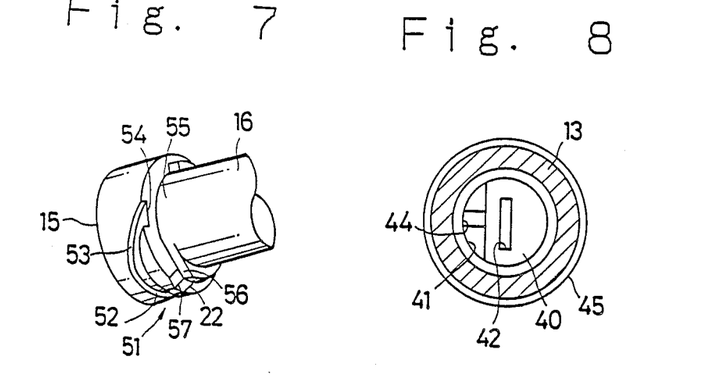
FIG. 7 is a perspective view of a flange portion of the key cylinder.
FIG. 8 is a sectional view taken along a line 8—8 of FIG. 1.

As shown in FIGS. 2 and 8, the cover 13 is provided with a rectangular opening 44 in which the protrusion 39 is located when the key cylinder 16 is in the forward position without insertion of the key. A bezel 45 made of synthetic resin is rotatably mounted on the outer surface of the cover 13. The bezel 45 includes a central throughhole 46 and a recess 47 formed on the inner surface thereof. When the key cylinder 16 is in the forward position, the protrusion 39 of the key cylinder 16 is placed in the recess 47 to prevent the relative rotation of the bezel 45 to the key cylinder 16.

The retainer 20 disposed within the sleeve 12 extends rearward and longitudinally along the key cylinder 16 and the rotator 23. The front end 50 of the retainer 20 abuts the cam 51 (FIG. 7) formed on the flange portion 15 of the key cylinder 16. The rear end 58 of the retainer 20 extends through the hole 27 formed in the housing 11.

As seen in FIG. 7, the cam 51 comprises a flat portion 52 formed in front of the hole 21 in which the detent 22 is located, a slant portion 53 communicated with the flat portion 52, a stepped portion 54 formed at an end of the slant portion 53, a lower portion 55 formed beneath the stepped portion 54, a top portion 56 raised from the lower portion 55 adjacent to the hole 21, and a return portion 57 connecting the rising portion 56 and the flat portion 52 and passing above the hole 21. In other words, the return portion 57 is positioned radially outward of the detent 22. When the front end 50 of the retainer 20 is moved rearward upon engagement with the slant portion 53, the rear end 58 of the retainer 20 comes into a notch 60 formed in the locking rod 18.

Turning now to FIG. 2, the sleeve 12 is formed with a radial slot 62 to receive a spring 63 and a metallic ball 64. Since the ball 64 elastically urges the retainer 20 by resilient force of the spring in a radial and inward direction, the front end 50 of the retainer 20 always abuts the cam 51. A coil spring 59 is disposed around the retainer 20 between the housing 11 and a stepped portion 58 provided on the retainer 20. Accordingly, the retainer 20 and key cylinder 16 are always resiliently urged forward by the spring 59. An ignition switch device (not shown) is mounted within a recess 65 formed in the rear portion of the housing 11.

In assembling the steering column shaft locking device 10 according to the present invention, the key cylinder 16 is fixed with the rotator 23 by the pin 25. Then, after the retainer 20 and the detent 22 are mounted in the sleeve 12, the key cylinder 16 is inserted into the sleeve 12. Subsequently, the lever 33 is placed in the slot 30 in the flange portion 15 of the key cylinder 16, and simultaneously the guard plate 40 is located in the circular recess 41 of the cover 13 so that the sleeve 12 is disposed in the housing 11, and the cover 13 is secured to the housing 11 with pins not shown. The ignition switch device including the key detecting switch is mounted in the recess 65. After completion of assembling, the protrusion 39 of the key cylinder 16 extends through the opening 44 of the cover 13 into the recess 47, and therefore the bezel 45 can not be rotated without the key.

In operation, when the key 28 is inserted into the key hole 26 of the key cylinder 16, an inner top of the key 28 is brought into contact with one end 34a of the lever body 34 and turns the lever 33 counterclockwise around the pins 35 in FIG. 2 so that the other end 34b of the lever 34 applies reaction force on the inner surface of the guard plate 40. As understood from FIG. 6, by the counterclockwise rotation of the lever 33, the key cylinder 16 moves backward to the inner position against resilient force of the spring 59 and the rear end 23a of the rotator 23 turns the key detecting switch from "OFF" to "ON" or vice versa in the ignition switch device to produce an electric signal. At the same time, with the backward movement of the key cylinder 16, the protrusion 39 of the flange 15 is withdrawn from the recess 47 of the bezel 45 and the opening 44 of the cover 13 to allow the key 28, key cylinder 16 and bezel 45 to rotate together.

When the key 28 together with the key cylinder 16 is rotated around the longitudinal central axis of the key cylinder 16 from "LOCK" to "OFF" position, the front end 50 of the retainer 20 is moved from the flat portion 52 to the slant portion 53 of the cam 51. With further rotation of the key 28, the front end 50 is relatively moved backward along the slant portion 53 against resilient force of the spring 59 during which the locking rod 18 is moved from the locking position engaged with a recess formed in a steering shaft to the unlocking position disengaged therewith in cooperation of a cam (not shown) formed in the rotator 23, and simultaneously, the rear end 58 of the retainer 20 enters the notch 60 of the locking rod 18.

After a sufficient length of the rear end 58 has been inserted into the notch 60, the front end 50 is radially inwardly moved from the stepped portion 54 to the lower portion 55 of the cam 51 under resilient force of the spring 63 through the ball 64. Then, the key 28 may be rotated to shift the ignition switch device through "ACC" to "ON" or "START" position.

If the key 28 is adversely rotated around the longitudinal central axis from "ON" to "LOCK" position, the front end 50 is moved from the lower portion 55 to the top portion 56. At this time, due to the key 28 inserted in the key hole 26, the detent 22 is retained in the radially outwardly protruded position from the key cylinder 16, and the front end 50 abuts an inner surface 22a of the detent 22. Accordingly, until the key 28 has been pulled out of the key hole 26 of the key cylinder 16, the rear end 58 of the retainer 20 is kept inserted into the notch 60 of the locking rod 18 which consequently is maintained in the unlocking position. When the key 28 is withdrawn from the key hole 26 in "LOCK" position, the detent 22 is moved radially inwardly under resilient force of the spring 59 loaded on the retainer 20 which is subsequently returned to the flat portion 52 through the return portion 57. Simultaneously, the key cylinder 16 is moved from the rear position shown in FIG. 6 to the front position shown in FIG. 2 also under the resilient force of the spring 59 so that the key detecting switch in the ignition switch device may detect the withdrawal of the key 28.

As above-mentioned, when the key 28 is inserted into the steering column shaft locking device 10, it comes into contact with one end 34a of the lever 33 which is so rotated that the other end 34b applies reaction force on the cover 13 through the guard plate 40, thereby causing the key cylinder 16 to travel backward and the key detecting switch to be operated. While the key 28 is rotated, the key cylinder 16 is also rotated together with the lever 33 and guard plate 40 around the longitudinal central axis of the key cylinder 16 during which the other end 34b of the lever 33 is always in contact relation to the guard plate 40. This would realize smooth rotation of the key 28 without any mechanical damage such as abrasion of the lever 33.

Figure 9:
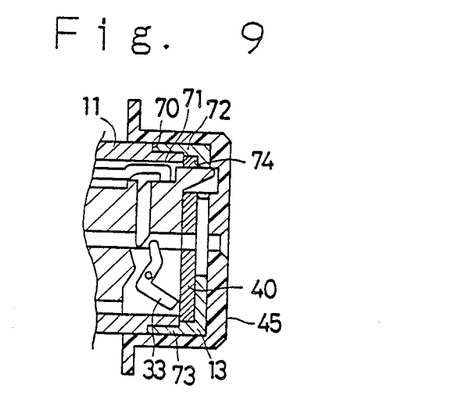
FIG. 9 is a sectional view indicating a front portion of a steering column shaft locking device according to a second embodiment of the present invention.

The present invention may be varied in various ways. For instance, FIG. 9 indicates a second embodiment of the present invention wherein a stepped portion 70 and a thin portion 71 may be formed at the front end of the housing 11 and in accordance therewith, a stepped portion 72 and a thin portion 73 may be formed in the cover 13. The thin portion 73 of the cover 13 is attached to the outer surface of the thin portion 71 of the housing 11 so as to contact the stepped portion 72 of the cover 13 to the front end of the thin portion 71 of the housing 11 and then an annular groove 74 is formed between the housing 11 and cover 13. The guard plate 40 may be rotatably located in the annular groove 74 without axial movement.

Figure 10:
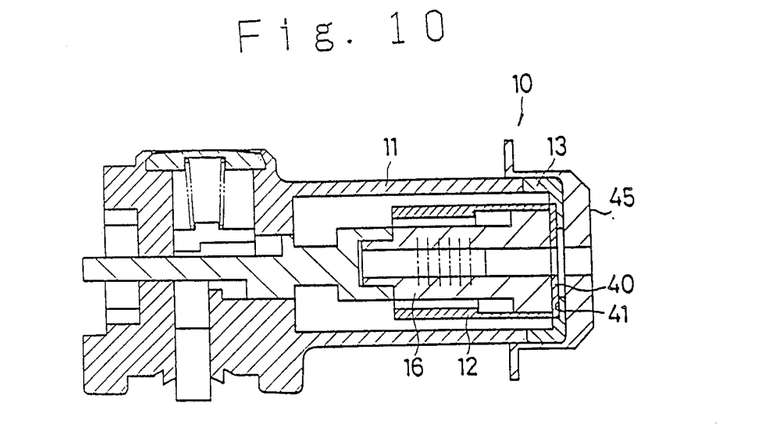
FIG. 10 is a sectional view of a third embodiment of the invention.

FIG. 10 shows a third embodiment of the invention wherein the guard plate 40 is rotatably disposed in a circular recess 41 formed in the cover 13, facing a front end of the sleeve 12 to prevent axial movement of the guard plate 40.

Figure 11:
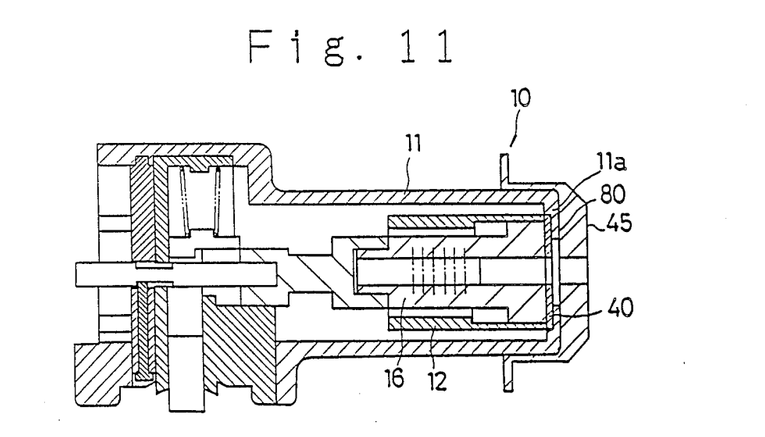
FIG. 11 is a sectional view of a fourth embodiment of the invention.

Moreover, FIG. 11 exhibits a still another embodiment of the invention wherein the front wall 11a including a rim 80 is formed integrally with the other portion of the housing by diecasting or molding in lieu of the cover 13. U.S. Pat. No. 4,516,415 discloses a locking device having a basic and similar structure of the type shown in FIG. 11.

In place of the spring 59 urging the key cylinder 16, another resilient member such as a spring may be placed between the sleeve 12 and the key cylinder. In brief, when the key is inserted into the steering column shaft locking device of the present invention, the reaction force which is applied on the front wall of the housing by the lever allows the key cylinder to move backward, and the guard plate to which the other end of the lever is touched serves to smoothly rotate the key and to prevent abrasion of the lever and unauthorized insertion of tools into the key hole.

As understood from the foregoings, the lever provides a large and sufficient stroke for movement of the key cylinder when the key is put into the device, thereby the key detecting switch may certainly be operated in the ignition switch device to produce an electric signal.

What is claimed is:

1. A steering column shaft locking device for an automotive vehicle comprising:
    a housing having a cover,
    a key cylinder having a key slot disposed moveably in said housing,
    a first aperture in said cover providing clearance for introducing a key into said key slot and providing clearance for rotating said key relative to said housing,
    a second aperture in said cover for receiving a protrusion extending from said key cylinder whereby said key cylinder is locked to said housing to preclude relative rotation between said housing and said key cylinder, in which a bezel means having a key slot is mounted rotatably on said cover and the bezel means is formed with a recess for receiving said protrusion whereby said bezel means is locked to said housing to preclude relative rotation between said housing and said bezel means.

2. The device of claim 1 in which a guard plate having a key slot is disposed between the key cylinder and said cover, said guard being shaped to provide clearance for said protrusion.

3. The device of claim 2 in which the key cylinder carries a lever means which is operable in response to insertion of a key in said key cylinder to move said key cylinder away from said guard plate to unlock the key cylinder and the bezel means.

4. The device of claim 3 in which the housing includes a sleeve-like guide means for supporting the key cylinder.

5. The device of claim 4 in which a moveable retainer means is carried by the guide means and supported further by the housing, said retainer means being operable to actuate a steering shaft locking rod.

6. The device of claim 5 in which the key cylinder includes a moveable detent means responsive to insertion of a key operable to block motion of said retainer means relative to said key cylinder when said key cylinder moves away from said guard plate.

7. The device of claim 6 including cam means formed on said key cylinder for engaging and moving said retainer means when said key cylinder is rotated, whereby said retainer means engages and operates said locking rod.

8. The device of claim 3 which includes spring means for urging said key cylinder into contact with said guard plate.

9. A steering column shaft locking device for an automotive vehicle, comprising:
    a housing having a cover including a front wall;
    a key cylinder located within said housing for rotation around its longitudinal central axis and longitudinal movement by a key;
    a locking rod capable of traveling between a locking position in which it is engaged with a steering shaft and an unlocking position in which it is disengaged from said steering shaft;
    a guard plate rotatably disposed between the front wall of said housing and said key cylinder, the axial movement of said guard plate being prevented; and
    a lever mounted within said key cylinder and being rotatable around an additional axis for applying reaction force on said guard plate, without contact with said housing when said key is inserted into said key cylinder, thereby causing said key cylinder to inwardly travel in said housing away from said guard plate.

10. A steering column shaft locking device for an automotive vehicle as defined in claim 9, said front wall of the housing being defined by a rim integrally formed with said housing or by a cover secured to said housing.

11. A steering column shaft locking device for an automotive vehicle as defined in claim 9 including a sleeve surrounding said key cylinder, said guard plate being positioned for rotation around the longitudinal central axis of the key cylinder within a circular or annular recess defining a rim formed in said cover, said cover being fixed at the front end of the housing, said guard plate being disposed between said rim of said housing and said sleeve.

12. A steering column shaft locking device for an automotive vehicle as defined in claim 9, said lever including a lever body and a pair of pins protruded from said lever body, one end of said lever body being in contact with said key inserted so that said lever body may rotate around said pins which provides said additional axis, thereby causing the other end of said lever body to apply reaction force on said front wall of housing for longitudinal movement of said key cylinder.

13. A steering column shaft locking device for an automotive vehicle as defined in claim 9, further comprising a retainer capable of being engaged with said locking rod in the unlocking position when said key cylinder is rotated and for holding said locking rod in the unlocking position until said key is pulled out; and
    a spring wound around said retainer for urging said retainer away from said locking rod and also for urging said key cylinder toward said front wall of the housing.

14. A steering column shaft locking device for an automotive vehicle as defined in claim 9, further comprising a bezel attached to the front end of the housing and having a central throughhole into which the key may be inserted.

15. A steering column shaft locking device for an automotive vehicle, comprising:
- a housing having a front wall;
- a key cylinder located within said housing for rotation around its longitudinal central axis and longitudinal movement by a key;
- a locking rod capable of traveling between a locking position in which it is engaged with a steering shaft and an unlocking position in which it is disengaged from said steering shaft;
- a lever mounted within said key cylinder and being rotated around an additional axis for applying reaction force on the front wall of said housing when said key is inserted into said key cylinder to permit said key cylinder to inwardly travel in said housing, said front wall of said housing being formed with an opening;
- a retainer capable of being engaged with said locking rod in the unlocking position when said key cylinder is rotated and for holding said locking rod in the unlocking position until said key is pulled out;
- a spring for urging said retainer away from said locking rod and also for urging said key cylinder toward said front wall of the housing; and
- a bezel attached to the front end of the housing and having a recess formed on the inner surface;
- said key cylinder having a protrusion which extends through said opening of said front wall of the housing into the recess of said bezel to prevent rotation of said bezel when said key cylinder is in the locking position.

* * * * *